June 19, 1923.
R. O. HEGGELUND
INSECT DESTROYER
Filed Feb. 11, 1922
1,459,396
2 Sheets-Sheet 1
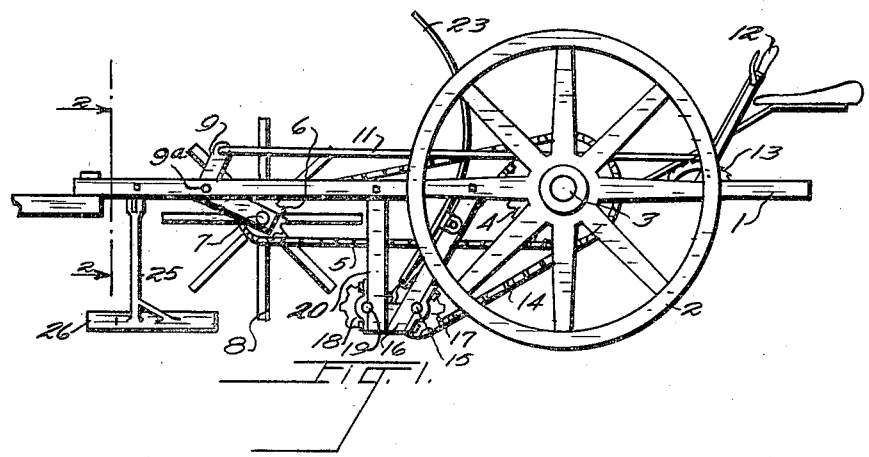
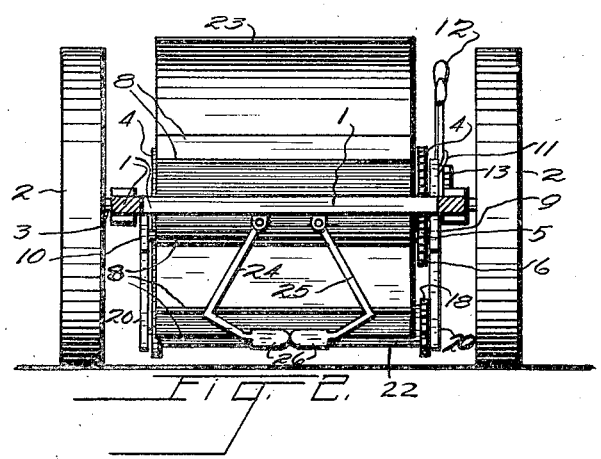

June 19, 1923. 1,459,396
R. O. HEGGELUND
INSECT DESTROYER
Filed Feb. 11, 1922 2 Sheets-Sheet 2

Witnesses
William P. Piper
Paul A. Viesen

Inventor
R. O. Heggelund
By H. J. Sanders
Atty.

Patented June 19, 1923.

1,459,396

UNITED STATES PATENT OFFICE.

RAGNAR O. HEGGELUND, OF LAKE PRESTON, SOUTH DAKOTA.

INSECT DESTROYER.

Application filed February 11, 1922. Serial No. 535,925.

*To all whom it may concern:*

Be it known that I, RAGNAR O. HEGGELUND, a subject of the King of Norway, residing at Lake Preston, in the county of Kingsbury and State of South Dakota, have invented certain new and useful Improvements in Insect Destroyers, of which the following is a specification.

This invention relates to improvements in potato bug destroyers and more particularly to that class of machines adapted to be driven through fields of growing vegetation to automatically gather insects and destroy them. Simplicity of construction and operation, and efficiency are objects sought. With the foregoing and other objects in view the invention consists in the combination and arrangement of parts to be hereinafter fully described, pointed out in the appended claims and illustrated in the accompanying drawings which form a part of this application and in which—

Fig. 1 is a view of my improved machine in side elevation.

Fig. 2 is a front view taken on line 2—2 of Fig. 1.

Like reference characters denote corresponding parts throughout the several views.

Figure 3:
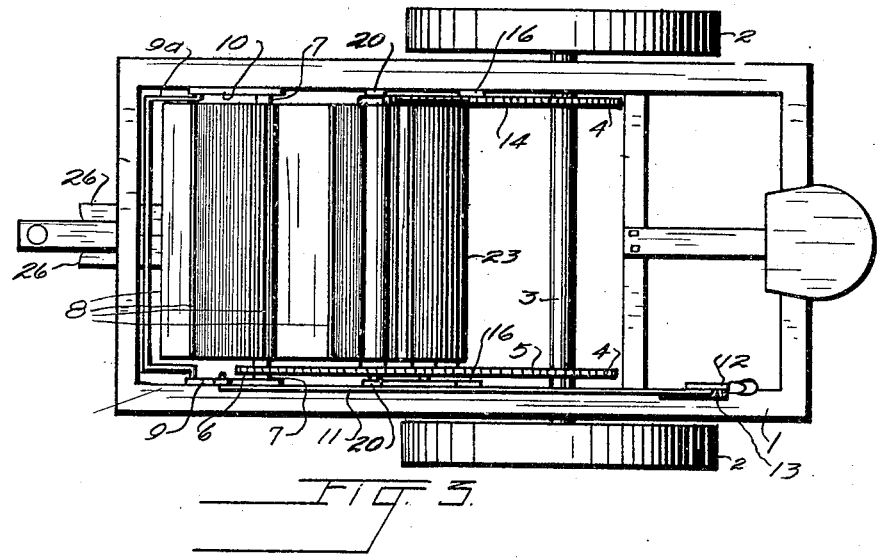
Fig. 3 is a plan view of the machine.
Figure 4:
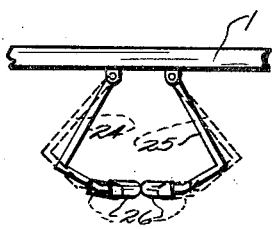
Fig. 4 is a detail of the gravity shoes and arms employed.
Figure 5:
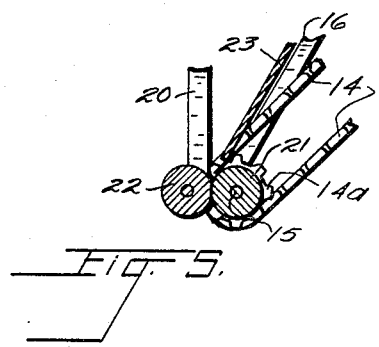
Fig. 5 is a detail of the grinding rolls and connections.

My machine comprises the frame 1 supported upon the wheels 2 which are connected by the rotary axle 3 that carries and rotates the sprocket wheels 4, one of which is connected by a chain 5 to a smaller sprocket wheel 6 fast upon the shaft 7 of the paddle wheel 8, said shaft 7 being carried by a bell-crank 9 fulcrumed upon shaft $9^a$ to one side of the frame and by a link 10 also fulcrumed upon said shaft. The shaft $9^a$ may be substantially U-shaped to afford clearance for other parts of the machine and extends from side to side of the frame and has its ends journaled in the frame. A connecting rod 11 extends from the bell-crank 9 to a hand lever 12 that is fulcrumed to the frame and that works over a segment 13 carried by the frame. By moving the lever 12 over the segment 13 the rod 11 is made to rock the bell-crank 9 and so raise and lower the shaft 7 and paddle wheel 8, said shaft 7 being carried by one end of the bell-crank and by the said link 10. One sprocket wheel 4 is connected by a sprocket chain 14 with a small sprocket $14^a$ upon the transverse shaft 15 which is carried by the depending bars 16 secured to the sides of the frame 1 and a gear 17 fast upon shaft 15 is in mesh with another gear 18 fast upon the shaft 19 journaled in depending bars 20 carried by the frame. Each shaft 15, 19 carries one of the rollers 21, 22 which rotate with said shafts, said shafts being driven by the meshing gears 17, 18, said rollers being so positioned that they effect contact with each other as they rotate. To the bars 16 I secure the curved shield 23 the lower end of which is disposed immediately above the rollers 21, 22. To the front end of the frame 1 I secure the two angular depending arms 24, 25, pivotally, said arms carrying the shoes 26. The shape of the arms and the weight of the shoes is such as to yieldingly keep the shoes in engaged relation by gravity.

In operation the machine is drawn through a field with the wheels 2 upon opposite sides of a row of potatoes. The shoes 26 are suspended immediately above the potato hills in such position that they contact with and tend to spread apart the leaves and stems of the plants, or to raise them from a drooping position. The rotating paddle wheel 8, driven by the sprockets 6, 4 and chain 5, now encounters to potato plants and knocks the insects therefrom upon the shield 23 from which they drop upon and between the rollers 21, 22 and are crushed and destroyed.

What is claimed is:—

1. In an insect destroyer, a wheeled frame, a paddle wheel adjustably carried in said frame and driven by rotation of the frame wheels, rotary contacting rollers carried by said frame and driven by rotation of the frame wheels, a shield arranged in the frame and having one end disposed immediately above said rollers, angular arms suspended pivotally from said frame, and shoes carried by said arms and normally in yielding engagement with each other.

2. In an insect destroyer, a wheeled frame, a paddle wheel adjustably arranged in said frame and driven by rotation of the frame wheels, rotary contacting rollers carried by said frame and driven by rotation of the frame wheels, a shield arranged in the frame and having one end disposed immediately above said rollers, and gravity controlled shoes carried at the front end of the frame in advance of said paddle wheel and normally in yielding engagement with each other, the contacting surfaces of said shoes being disposed substantially at the longitudinal center of the frame.

In testimony that I claim the foregoing as my own I have hereto affixed my signature in the presence of two subscribing witnesses.

RAGNAR O. HEGGELUND.

Witnesses:
OTTO O. THOSNER,
FLORENCE E. SPOONER.